Oct. 26, 1971    K. R. PFRENGLE    3,614,960
VENT CONTROL

Filed April 28, 1969    2 Sheets-Sheet 1

INVENTOR.
Kenneth R. Pfrengle
BY
C. K. Veenstra
ATTORNEY

INVENTOR.
Kenneth R. Pfrengle
BY
C. H. Veenstra
ATTORNEY

United States Patent Office 3,614,960
Patented Oct. 26, 1971

3,614,960
VENT CONTROL
Kenneth R. Pfrengle, Rochester, N.Y., assignor to
General Motors Corporation, Detroit, Mich.
Filed Apr. 28, 1969, Ser. No. 819,926
Int. Cl. B65d *51/16;* F16k *33/00*
U.S. Cl. 137—43
1 Claim

ABSTRACT OF THE DISCLOSURE

Vent lines from a vehicular gasoline tank are connected to a vent control device having a float operated valve which prevents loss of liquid fuel from the tank.

SUMMARY OF THE INVENTION

This invention relates to a control for tank venting arrangements which is particularly suitable for preventing liquid gasoline from draining out of vehicular gasoline tanks.

Various proposals for reducing the loss of fuel vapor from vehicular fuel tanks to the atmosphere have included systems in which the fuel tank vent lines are re-routed to fuel vapor storage devices. To assure efficient operation of these systems, as well as to conserve fuel and to reduce the danger of fire, it is desirable to prevent liquid fuel from draining out of the tank through the vent lines into the storage device.

This invention provides a vent control device, applicable to certain fuel tank venting arrangements, which allows venting of fuel vapor from the fuel tanks through the vent lines, which allows air to enter the tanks through the vent lines, but which prevents liqiud fuel from draining out of the tanks through the vent lines. The device includes a valve which closes as liquid fuel enters the device, thus preventing passage of liquid fuel therethrough.

In the preferred embodiment shown herein, a pair of vent lines extend from laterally opposite upper front corners of the fuel tank, which is located in the rear of the vehicle. A third vent line extends from the middle of the upper rear portion of the tank. These vent lines are connected through the vent control device to a single vapor line; the vapor line may be routed to a fuel vapor storage device if desired.

The front vent lines potentially could permit liquid fuel to drain out of the tank when the vehicle is directed down and incline. To prevent this from occurring, the front vent lines are connected to a chamber within the vent control device which has its outlet controlled by a float operated valve. Normally, the outlet is open to permit venting of fuel vapor from the tank and admission of air to the tank. However, if liquid fuel enters the chamber from the front vent lines, the float is raised and causes the valve to close the outlet from the chamber.

The location of the inlet to the rear vent line does not permit liquid fuel to drain out of the tank through this line. Therefore, the rear vent line may be connected to a second chamber in the vent control device which has an essentially unrestricted outlet. This permits venting of the tank even though the valve in the vent control device may be closed.

The details as well as other objects and advantages of this invention are set forth in the drawings and in the detailed description of the devices shown therein.

DETAILED DESCRIPTION

Figure 1:
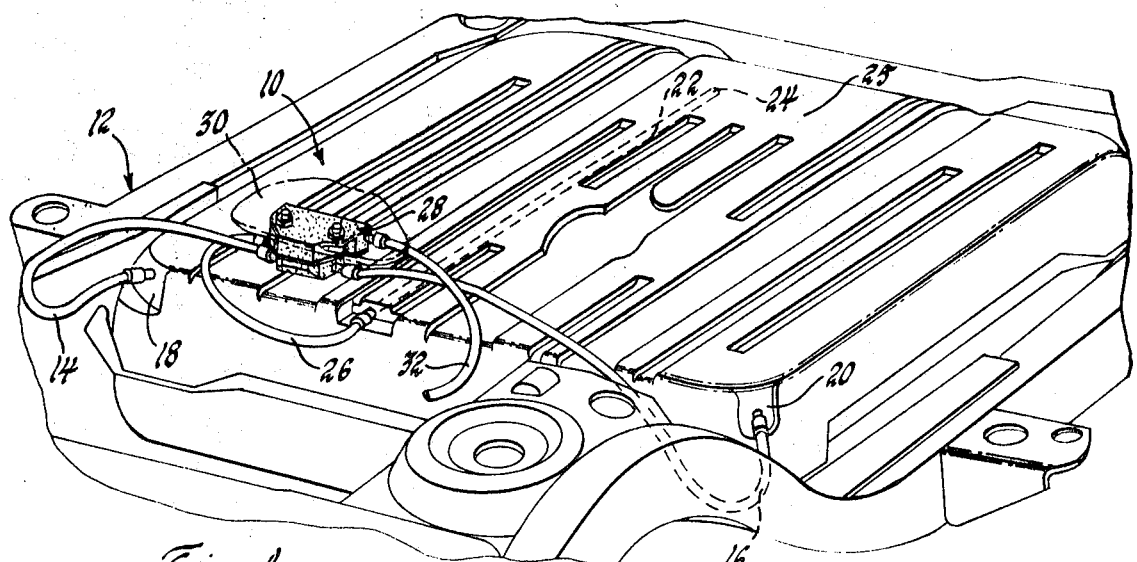
FIG. 1 is a view of a preferred form of the vent control device showing its connections to the venting arrangement of a gasoline tank mounted in the rear of a vehicle.

Referring first to FIG. 1, a fuel tank 10 is disposed in the rear of a vehicle indicated by 12. A pair of vent lines 14 and 16 extend from the upper forward corners 18 and 20 of fuel tank 10. Another vent line 22 has one end 24 located in the middle of the upper rear portion 25 of fuel tank 10 and extends internally of fuel tank 10 to the forward portion thereof. Vent line 22 includes an extension line 26 outside fuel tank 10.

Lines 14, 16 and 26 are connected to a vent control device 28 mounted on the underside 30 of vehicle 12 in front of and above tank 10. A vapor line 32 may extend from vent control device 28 and may be connected to a suitable fuel vapor storage device if desired.

Figure 2:
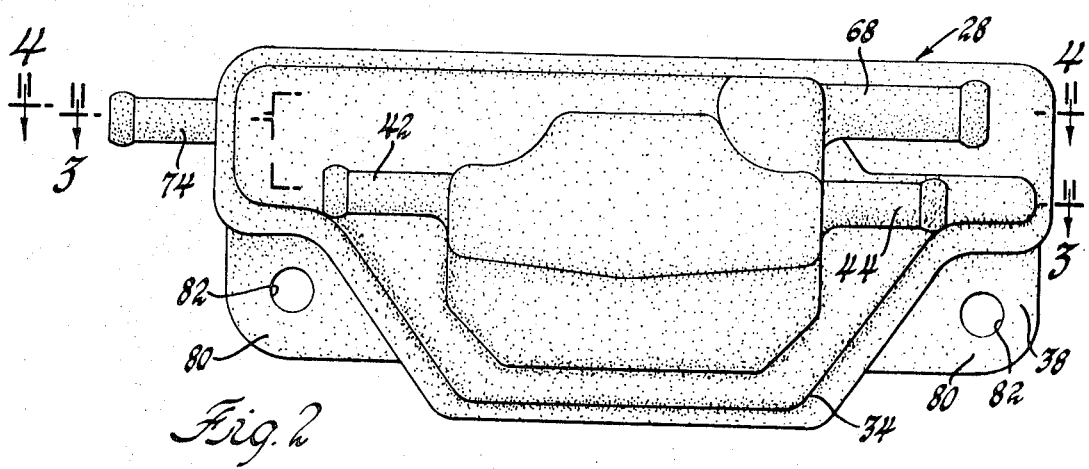
FIG. 2 is a bottom view of the vent control device shown in FIG. 1, enlarged to illustrate its configuration.
Figure 3:
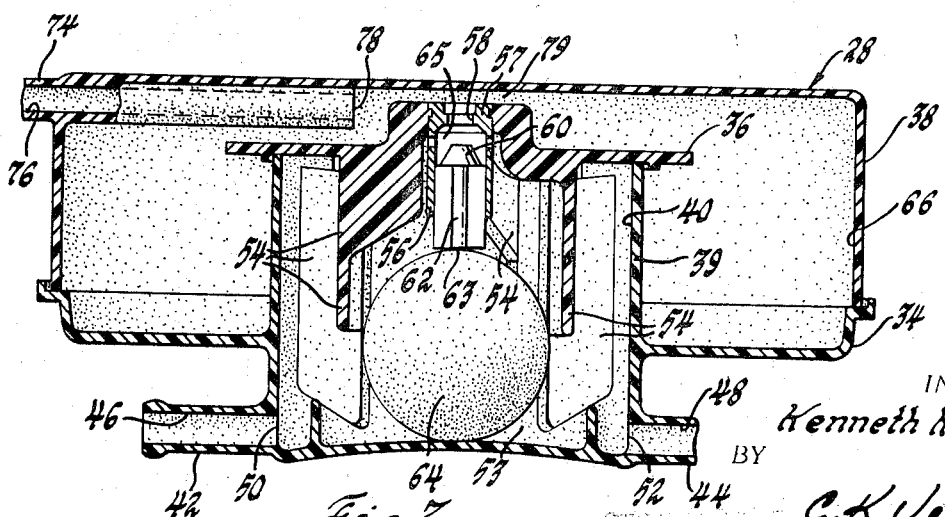
FIG. 3 is a sectional view taken along line 3—3 of FIG. 2 showing the chamber containing the float controlled check valve and to which the vent lines from the front of the tank are connected.
Figure 4:
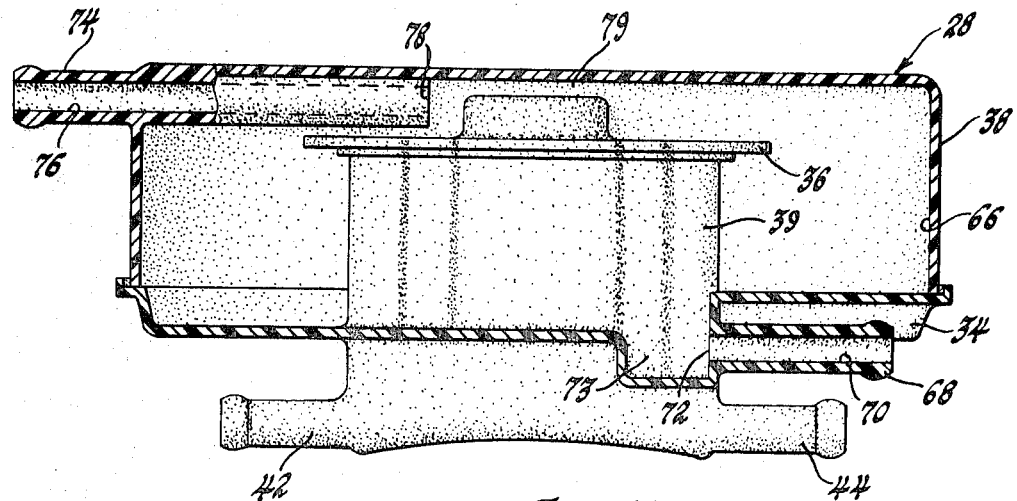
FIG. 4 is a sectional view along line 4—4 of FIG. 2 showing the chamber to which the vent line from the rear of the tank is connected.

Referring now to FIGS. 2, 3 and 4, vent control device 28 has a housing formed of heat stabilized nylon and which includes a base 34, a cover 36, and an enclosure 38.

Base 34 includes a vertical wall 39 which, together with cover 36, defines a first chamber or well 40. A pair of fittings 42 and 44, formed in base 34, provide passages 46 and 48, the ends 50 and 52 of which terminate in wall 39 at the bottom 53 of chamber 40. Fittings 42 and 44 receive front vent lines 14 and 16.

Base 34 and cover 36 provide a plurality of ribs 54 which strengthen the unit. A brass valve seat member 56 is secured in cover 36, the horizontal upper end 57 of which has an orifice 58 extending vertically therethrough. The lower side of orifice 58 defines a seat for the conical tip 60 of a stainless steel valve 62. The bottom 63 of valve 62 rests on a spherical float 64 formed from a rigid foamed closed cell polymer, such as "Nitrophyl."

Orifice 58 provides communication between the top 65 of chamber 40 and a second chamber 66, surrounding chamber 40, which is defined by base 34 and enclosure 38. Another fitting 68, formed in base 34, provides a passage 70 terminating at one end 72 in the bottom 73 of chamber 66. Fitting 68 receives rear vent line 22, 26. Enclosure 38 includes a fitting 74, to which vapor line 32 is connected, which has a passage 76 extending a substantial distance into chamber 66 and terminating at one end 78 near the upper middle portion 79 of chamber 66.

Enclosure 38 includes a pair of flanges 80 having openings 82 which receive studs for securing device 28 in place.

In operation, the rear portion 25 of fuel tank 10 is vented through line 22, 26 and passage 70 to chamber 66. Chamber 66 is in turn vented through passage 76 and line 32, and in some cases through a fuel vapor storage device, to an atmospheric pressure source. Fuel vapor contained in the rear portion of fuel tank 10 is thus vented from fuel tank 10, and air is thus admitted to fuel tank 10 as liquid fuel is drawn therefrom. Any liquid fuel that may be splashed into or condensed within vent line 22, 26 is separated from the fuel vapor within chamber 66 and eventually returns to the tank through passage 70 and vent line 22, 26. Because passage 76 extends into the middle portion of chamber 66, any liquid fuel which may be contained in vent line 22, 26 is trapped in chamber 66 and cannot be discharged through passage 76 and vapor line 32. The possibility that liquid fuel will be lost from rear vent line 22 through vapor line 32 is thereby minimized.

The forward corners 18, 20 of fuel tank 10 are vented through lines 14 and 16 and passages 42 and 44 to chamber 40 of vent control device 28. If no liquid fuel is present in chamber 40, float 64 and valve 62 will be in their lower positions, as illustrated, so that chamber 40 is vented through orifice 58, chamber 66, passage 76, vapor line 32, and perhaps a fuel vapor storage device, to a source of atmospheric pressure. Fuel vapor is thus vented from fuel tank 10, and air is thus admitted to fuel tank 10. Should vehicle 12 be directed down an incline, or should maneuvering of vehicle 12 otherwise cause liquid fuel to drain from tank 10 through vent lines 14 and 16, liquid fuel will enter chamber 40. Float 64, guided by ribs 54, will rise as the amount of liquid within chamber 40 increases and will cause tip 60 of valve 62 to close orifice 58. Loss of liquid fuel from tank 10 is thus prevented.

It should be appreciated with respect to the foregoing description that the orientation of the fittings on device 28 may be varied to suit routing requirements of the lines without affecting operation of device 28.

Figure 5:
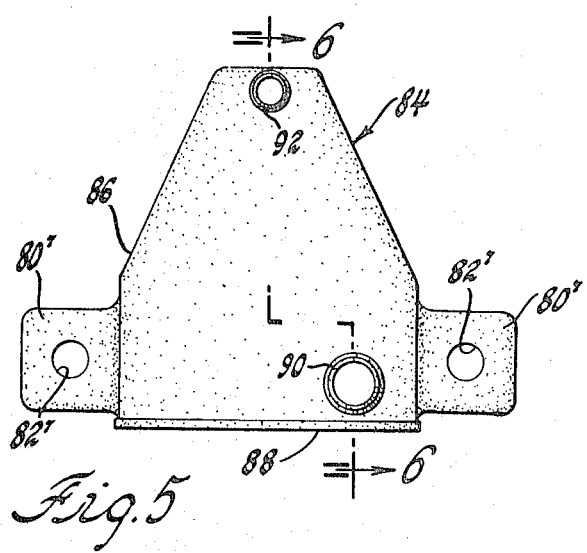
FIG. 5 is an elevational view of a vent control device applicable to some venting arrangements where the preferred form is not applicable.
Figure 6:
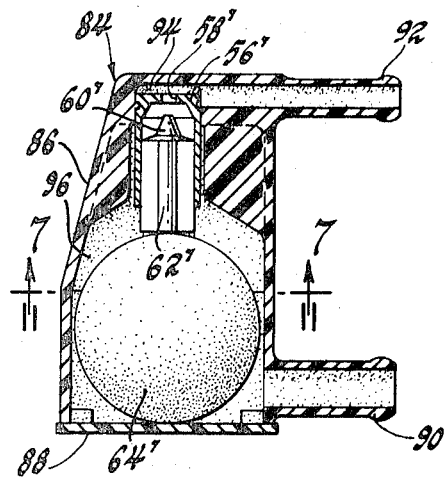
FIG. 6 is a sectional view along line 6—6 of FIG. 5 illustrating the float controlled check valve.
Figure 7:
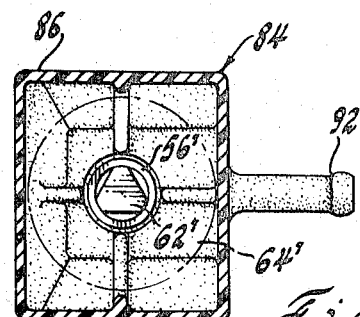
FIG. 7 is a sectional view along line 7—7 of FIG. 6 illustrating the disposition of the float and the check valve within the housing.

FIGS. 5, 6 and 7 illustrate another design of a vent control device applicable to some venting arrangements where the preferred form of FIGS. 2, 3 and 4 is not applicable. This vent control device 84 includes a housing 86 and a base 88, each formed of heat stabilized nylon. Housing 86 is equipped with flanges 80' having openings 82' which receive mounting studs.

Housing 86 has a fitting 90 to which the vent line from a fuel tank is connected and a fitting 92 to which a vapor line may be connected. A brass valve seat member 56' is secured within housing 86 and divides it into upper and lower chambers 94 and 96 respectively. Chambers 94 and 96 are connected by an orifice 58' formed in member 56. Orifice 58' is controlled by the conical top 60' of a stainless steel valve member 62'. Valve 62' is operated by a spherical float 64' formed from a rigid foamed closed cell polymer.

Vent control device 84 operates in a manner similar to that described above: Normally, the fuel tank is vented through fitting 90, chamber 96, orifice 58, upper chamber 94, and fitting 92, but if liquid fuel enters lower chamber 96, float 64' rises to set tip 60' of valve 62' and close orifice 58'. Fuel vapor may thus be discharged from the fuel tank, air may thus be admitted to the fuel tank, but loss of liquid fuel from the tank is prevented.

Valves 62 and 62' are similar, as are floates 64 and 64'. Best operation of devices 28 and 84 has been achieved when valves 62 and 62' weigh from about 7.3 to about 7.85 grams and when floates 64 and 64' have a diameter of about 1.3 inches and weight from about 2.95 to about 3.4 grams.

I claim:
1. A vehicular tank venting system comprising
    a tank disposed in a vehicle and adapted to contain liquid up to a certain level, said level being determined when the vehicle is resting on a horizontal surface,
    a vent control device disposed at one end of said tank and above said certain level, said device having first and second chambers,
    first and second vent lines extending from laterally spaced positions in said end of said tank above said certain level to the first chamber of said device for permitting fluid transfer therebetween,
    a third vent line extending from the other end of said tank above said certain level to the second chamber of said device for permitting gaseous transfer therebetween,
    said vent control device further having an orifice connecting said first chamber and said second chamber for permitting gaseous transfer therebetween and valve means for obstructing said orifice in response to flow of liquid into said first chamber from said tank to thereby prevent liquid transfer through said orifice from said first chamber to said second chamber,
    said vent control device also having an opening from said second chamber for permitting gaseous ingress and egress through said second chamber and said vent lines to and from said tank,
    whereby continuous venting of said tank through at least one of said vent lines is assured and whereby loss of liquid from said tank through said first and second vent lines, said first chamber, said orifice, said second chamber, and said opening is prevented.

References Cited
UNITED STATES PATENTS

| | | | |
|---|---|---|---|
| 1,401,048 | 12/1921 | Collver | 137—202 |
| 2,860,656 | 11/1958 | Eshbaugh | 137—202 |
| 3,029,463 | 4/1962 | Bishop | 137—202 X |

ALAN COHAN, Primary Examiner

U.S. Cl. X.R.
137—202; 220—44